(12) United States Patent
Qiu

(10) Patent No.: US 12,338,142 B2
(45) Date of Patent: Jun. 24, 2025

(54) FILTER ELEMENT AND FILTER HAVING THE FILTER ELEMENT

(71) Applicant: Solventum Intellectual Properties Company, Maplewood, MN (US)

(72) Inventor: Biyong Qiu, Shanghai (CN)

(73) Assignee: Solventum Intellectual Properties Company, Maplewood, MN (US)

( * ) Notice: Subject to any disclaimer, the term of this patent is extended or adjusted under 35 U.S.C. 154(b) by 857 days.

(21) Appl. No.: 17/604,524

(22) PCT Filed: Apr. 14, 2020

(86) PCT No.: PCT/IB2020/053507
§ 371 (c)(1),
(2) Date: Oct. 18, 2021

(87) PCT Pub. No.: WO2020/212845
PCT Pub. Date: Oct. 22, 2020

(65) Prior Publication Data
US 2022/0194820 A1    Jun. 23, 2022

(30) Foreign Application Priority Data
Apr. 18, 2019 (CN) .......................... 201910313888.7

(51) Int. Cl.
C02F 1/44 (2023.01)
B01D 63/10 (2006.01)

(52) U.S. Cl.
CPC ............ *C02F 1/441* (2013.01); *B01D 63/107* (2022.08); *C02F 1/442* (2013.01); *C02F 2201/004* (2013.01); *C02F 2201/006* (2013.01)

(58) Field of Classification Search
CPC .... C02F 1/441; C02F 1/442; C02F 2201/004; C02F 2201/006; C02F 1/003;
(Continued)

(56) References Cited

U.S. PATENT DOCUMENTS

| 4,645,601 A | 2/1987 | Regunathan |
|---|---|---|
| 5,221,473 A | 6/1993 | Burrows |

(Continued)

FOREIGN PATENT DOCUMENTS

| CN | 102407041 | 4/2012 |
|---|---|---|
| CN | 202705130 | 1/2013 |

(Continued)

OTHER PUBLICATIONS

International Search report for PCT International Application No. PCT/IB2020/053507 mailed on Jul. 22, 2020, 4 pages.

*Primary Examiner* — Thuan D Dang

(57) ABSTRACT

The present invention relates to a filter element and a filter having the filter element. The filter element comprises a filter element housing part, a water inlet disposed at the filter element housing part, a filter medium unit disposed in the filter element housing part, and a central pipe. The central pipe comprises a pure water collecting pipe and a wastewater collecting pipe, and the wastewater collecting pipe is at least partially disposed in the pure water collecting pipe. A wastewater passage and a pure water passage are arranged sequentially from the center to the circumference in the central pipe. The filter element and the filter according to the present invention has a more simplified filter element structure. By reducing the quantity of components, the filter is made more compact. The present invention can further accommodate positional errors within an allowed error range when the filter element is mounted to a local manifold 1 of the filter. Manufacturing precision requirements of filter components can thus be lowered and the cost can be reduced. The replacement and mounting of the filter element have therefore become easier.

14 Claims, 11 Drawing Sheets

(58) Field of Classification Search
CPC ............... B01D 63/107; B01D 63/025; B01D 2313/08; B01D 61/027; B01D 61/08; B01D 61/025
See application file for complete search history.

(56) References Cited

U.S. PATENT DOCUMENTS

| | | |
|---|---|---|
| 2006/0124517 A1 | 6/2006 | Scaringe |
| 2009/0230042 A1 | 9/2009 | Broussard |
| 2015/0321926 A1 | 11/2015 | McGibbon |
| 2016/0220956 A1* | 8/2016 | Hur ................... B01D 61/025 |
| 2018/0127294 A1 | 5/2018 | Zhang |

FOREIGN PATENT DOCUMENTS

| | | |
|---|---|---|
| CN | 203400633 | 1/2014 |
| CN | 105016430 | 11/2015 |
| CN | 105964012 | 9/2016 |
| CN | 205627657 | 10/2016 |
| CN | 106186199 | 12/2016 |
| CN | 206562355 | 10/2017 |
| CN | 206980260 | 2/2018 |
| KR | 2009-0119672 | 11/2009 |

\* cited by examiner

FILTER ELEMENT AND FILTER HAVING THE FILTER ELEMENT

CROSS REFERENCE TO RELATED APPLICATIONS

This application is a national stage filing under 35 U.S.C. 371 of PCT/IB2020/053507, filed Apr. 14, 2020, which claims the benefit of Chinese Application No. 201910313888.7, filed Apr. 18, 2019, the disclosure of which is incorporated by reference in its/their entirety herein.

TECHNICAL FIELD

The present invention relates to the field of filters, and in particular, to a filter element and a filter having the filter element.

BACKGROUND

The content of this part provides only background information related to the present invention, and does not necessarily constitute the prior art.

As the quality of life improves, the application of household water filters has grown in popularity because people have become more concerned about water safety. Water purifiers, such as reverse osmosis water purifiers, are a type of filter that is commonly used. In practical applications, there is an ongoing need for compact water purifier designs that can reduce the space occupied by water purifiers. The filter element is a key component of water purifiers. It should be noted that the structure of the filter element plays a major role in the compactness of the water purifier as a whole. Another point to note is that the filter element replacement has to be replaced after the filter element has been used for a period of time. After a water purifier has already been mounted, a user usually replaces the filter element manually as needed. In the process of replacing the filter element, mounting positional errors may occur between the filter element and the local manifold 1 of the water purifier due to limitations in manufacturing precision. The filter element may be damaged during both the detaching and mounting processes. For example, the wastewater outlet of the filter element may be misaligned with the wastewater port on the local manifold 1 of the water purifier. In this case, mounting the filter element to the local manifold 1 of the water purifier may be difficult. Furthermore, if the filter element were forcefully mounted to the local manifold 1 of the water purifier, damages to the seal and leakage may occur. Due to the rigidity of the wastewater pipeline of the filter element, the seal at the mounting position would be subjected to an excessive force asymmetrically applied to both sides of the seal. The aforementioned problems may be avoided by posing high requirements on the manufacturing precision of mutually matched components in the water purifier, such that the components would match precisely during assembly. However, achieving such precision would increase water purifier manufacturing costs.

SUMMARY

An objective of the present invention is to optimize the design of a filter to achieve a compact structure, reduce the quantity of components, and reduce the space occupied. Another objective of the present invention is to reduce the requirements on the manufacturing precision of components, reduce manufacturing costs, and simplify the mounting of a filter element of the filter.

One aspect of the present invention is to provide a filter element, the filter element comprising: a filter element housing part, the filter element housing part being provided with a water inlet; a filter medium unit, the filter medium unit being disposed in the filter element housing part; and a central pipe, the central pipe being disposed in the filter element housing part, and the filter medium unit being disposed around the central pipe. The central pipe comprises a pure water collecting pipe and a wastewater collecting pipe, and the wastewater collecting pipe is at least partially disposed in the pure water collecting pipe. A raw water passage of the filter element is at least partially formed between the inner wall of the filter element housing part and the filter medium unit, a pure water passage of the filter element is at least partially formed between the inner wall of the pure water collecting pipe and the outer wall of the wastewater collecting pipe, and a wastewater passage of the filter element is at least partially formed in the wastewater collecting pipe.

In an embodiment, the central pipe further comprises a central pipe adapter and a wastewater outlet pipe. A pure water pipeline of the filter element comprises the pure water collecting pipe and the central pipe adapter, and a wastewater pipeline of the filter element comprises the wastewater collecting pipe and the wastewater outlet pipe. A first end part of the central pipe adapter is hermetically attached to a first end part of the pure water collecting pipe, and a second end part of the central pipe adapter forms a pure water outlet. A first end part of the wastewater outlet pipe is hermetically attached to a first end part of the wastewater collecting pipe, and a second end part of the wastewater outlet pipe forms a wastewater outlet. The raw water passage further comprises a gap between the inner wall of the filter element housing part and the outer wall of the central pipe adapter, the pure water passage further comprises a gap between the inner wall of the central pipe adapter and the outer wall of the wastewater outlet pipe, and the wastewater passage further comprises the wastewater outlet pipe.

In an embodiment, the first end part of the wastewater outlet pipe is hermetically hinged to the first end part of the wastewater collecting pipe.

In an embodiment, the wastewater outlet pipe and the wastewater collecting pipe are made of the same material. Alternatively, the wastewater outlet pipe is made of a material more flexible than that of the wastewater collecting pipe.

In an embodiment, the central pipe further comprises a pure water outlet pipe and the wastewater outlet pipe, the pure water pipeline of the filter element comprises the pure water collecting pipe and the pure water outlet pipe, and the wastewater pipeline of the filter element comprises the wastewater collecting pipe and the wastewater outlet pipe. A first end part of the pure water outlet pipe is integrally formed with a first end part of the pure water collecting pipe, and/or the first end part of the wastewater outlet pipe is integrally formed with the first end part of the wastewater collecting pipe. A second end part of the pure water outlet pipe forms a pure water outlet, the second end part of the wastewater outlet pipe forms a wastewater outlet, the raw water passage further comprises a gap between the inner wall of the filter element housing part and the outer wall of the pure water outlet pipe, the pure water passage further comprises a gap between the inner wall of the pure water outlet pipe and the outer wall of the wastewater outlet pipe, and the wastewater passage further comprises the wastewater outlet pipe.

In an embodiment, a second end part of the wastewater collecting pipe is integrally formed to the pipe wall of the pure water collecting pipe. Alternatively, a second end part of the wastewater collecting pipe is hermetically attached to the pipe wall of the pure water collecting pipe.

In an embodiment, the second end part of the wastewater collecting pipe is adjacent to a second end part of the pure water collecting pipe such that the wastewater collecting pipe extends over a major part of the length of the pure water collecting pipe.

Preferably, a truncated-conical structure is formed between the second end part of the wastewater collecting pipe and the pure water collecting pipe.

In an embodiment, the pure water passage extends over at least a part of the length of the filter medium unit along the longitudinal direction of the filter element, a plurality of pure water collecting holes are disposed on the pipe wall of the pure water collecting pipe, and the plurality of pure water collecting holes are distributed across at least a part of the length of the filter medium unit.

The wastewater pipeline is disposed such that the wastewater outlet extends out from the filter element housing part, and the wastewater pipeline is adapted to be shaken flexibly when subjected to a force.

In an embodiment, the wastewater pipeline forms an elongated cantilever structure such that the wastewater pipeline is adapted to be shaken flexibly when subjected to a force.

Preferably, at least two members from the group consisting of the pure water collecting pipe, the wastewater collecting pipe, and the filter element housing part are disposed to be concentric with each other.

In an embodiment, the filter medium unit is a reverse osmosis membrane. Alternatively, the filter medium unit is a nanofiltration or another suitable filter medium.

Another aspect of the present invention is to provide a filter element, the filter element comprising: a filter element housing part, the filter element housing part being provided with a water inlet; a filter medium unit, the filter medium unit being disposed in the filter element housing part; a pure water pipeline, the pure water pipeline being disposed in the filter element housing part, and one end of the pure water pipeline being provided with a pure water outlet; and a wastewater pipeline, one end of the wastewater pipeline being provided with a wastewater outlet. The wastewater pipeline is disposed in the pure water pipeline, a raw water passage of the filter element is at least partially formed between the outer wall of the pure water pipeline and the inner wall of the filter element housing part, a pure water passage of the filter element is at least partially formed between the inner wall of the pure water pipeline and the outer wall of the wastewater pipeline, a wastewater passage of the filter element is at least partially formed in the wastewater pipeline, and the wastewater passage, the pure water passage, and the raw water passage are arranged sequentially from the center to the circumference along a radial direction of the filter element.

Still another aspect of the present invention is to provide a filter element, the filter element comprising: a filter element housing part, the filter element housing part being provided with a water inlet; a filter medium unit, the filter medium unit being disposed in the filter element housing part, and the filter medium unit comprising a reverse osmosis membrane; and a central pipe, the central pipe being disposed in the filter element housing part, and the filter medium unit being disposed around the central pipe. The central pipe comprises a pure water collecting pipe and a wastewater collecting pipe, the wastewater collecting pipe is at least partially disposed in the pure water collecting pipe, a pure water outlet pipe is attached to the pure water collecting pipe, a wastewater outlet pipe is attached to the wastewater collecting pipe, and the wastewater outlet pipe is at least partially disposed in the pure water outlet pipe. A pure water pipeline of the filter element comprises the pure water collecting pipe and the pure water outlet pipe, and a wastewater pipeline of the filter element comprises the wastewater collecting pipe and the wastewater outlet pipe. A raw water passage of the filter element is formed in the space defined by the inner wall of the filter element housing part, the filter medium unit, the outer wall of the pure water pipeline, and a seal abutting between the inner wall of the filter element housing part and the filter medium unit. A pure water passage of the filter element is formed in the space defined by the inner wall of the pure water pipeline and the outer wall of the wastewater pipeline. A wastewater passage of the filter element is at least partially formed in the wastewater pipeline. The wastewater passage, the pure water passage, and the raw water passage are arranged sequentially from the center to the circumference along a radial direction of the filter element.

Yet another aspect of the present invention is to provide a filter, the filter comprising a local manifold 1 and the filter element according to the present invention. The filter element is mounted to the local manifold 1 such that the water inlet of the filter element is in communication with a raw water port of the local manifold 1, the pure water outlet of the filter element is in communication with a pure water port of the local manifold 1, and the wastewater outlet of the filter element is in communication with a wastewater port of the local manifold 1.

The present invention has a more simplified filter element structure by concentrically arranging the wastewater passage, the pure water passage, and the raw water passage in the filter element sequentially from the center to the circumference along a radial direction of the filter element. By reducing the quantity of components, the filter is made more compact. The mounting and replacement of the filter element of the filter are also simplified. By providing a wastewater pipeline that is adapted to be flexibly shakable when subjected to a force, the present invention can lower the manufacturing precision requirement of the filter element and the components of the filter fitted thereto. As a result, the manufacturing cost can be further reduced, and the filter element can be replaced more easily, which prevents damages to the seal and the resulting leakage.

BRIEF DESCRIPTION OF THE DRAWINGS

The embodiments of the present invention are described below merely as examples with reference to the accompanying drawings. In the accompanying drawings, the same features or components are represented by the same reference numerals, and the accompanying drawings are not necessarily drawn to scale. Further, in the accompanying drawings.

DETAILED DESCRIPTION

Figure 1:
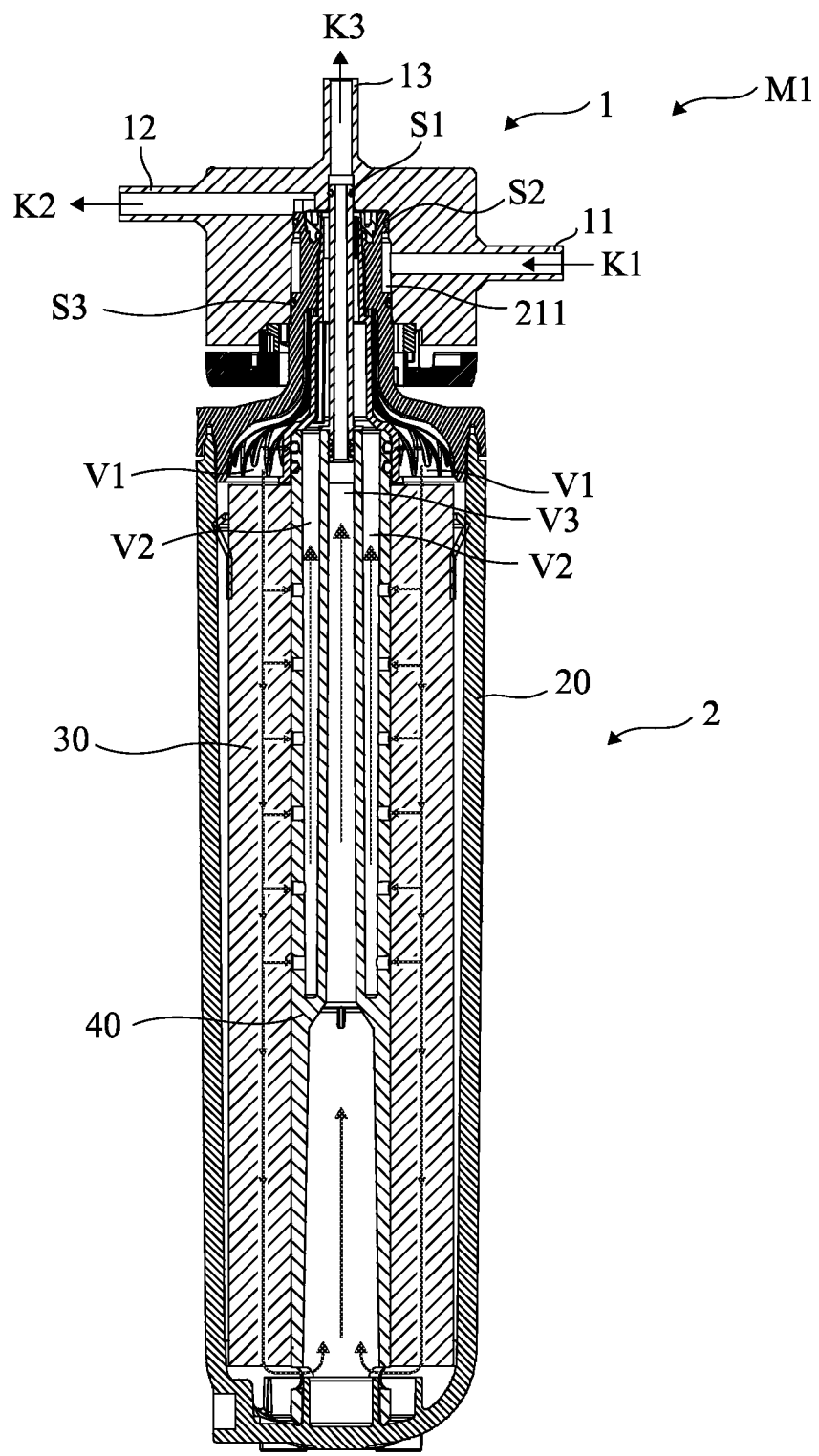
FIG. 1 is a sectional view of a filter according to a first embodiment of the present invention.

The following descriptions are substantially merely exemplary, and are not intended to limit the present invention, the application, and the use. It should be understood that in all of the accompanying drawings, similar reference numerals represent the same or similar parts and features. The accompanying drawings illustratively show the idea and principles of the embodiments of the present invention, but do not necessarily show specific size of each embodiment of the present invention and the scale thereof. In some parts of specific accompanying drawings, related details or structures of the embodiments of the present invention may be illustrated in an exaggerated manner.

In the descriptions of the embodiments of the present invention, the directional terms related to "up" and "down" are described according to the upper and lower positions in the views shown in the accompanying drawings. In a practical application of a filter, "upper" and "lower" positional relationships used herein may be defined according to actual conditions, and these relationships may be reversed.

The inventor has discovered that a rational design of various fluid passages in a filter element of a filter can facilitate the simplification of the structural design of the filter element, thereby facilitating optimization of the design and use of the filter. Based on the above, by rationally designing the various fluid passages in the filter element of the filter, the inventor has simplified the structure of the filter element, reduced the quantity of components to make the filter more compact, and simplified the mounting and replacement of the filter element of the filter. The filter according to the present invention can be used to filter municipal tap water. However, the present invention is not limited thereto. The filter according to the present invention can also be used to filter other fluids. A filter and a filter element thereof according to various embodiments of the present invention will be described respectively below by taking the application in filtration of the municipal tap water as an example with reference to the accompanying drawings.

First Embodiment

A filter M1 and a filter element 2 thereof according to a first embodiment of the present invention will be described below with reference to FIG. 1 to FIG. 9.

FIG. 1 shows a sectional view of the filter M1 according to the first embodiment of the present invention. As shown in FIG. 1, the filter M1 includes a local manifold 1 1 and the filter element 2. The local manifold 1 1 is provided with a raw water port 11, a pure water port 12, and a wastewater port 13. The filter element 2 includes a filter element housing part 20, and a filter medium unit 30 and a central pipe 40 that are accommodated in the filter element housing part 20. The filter medium unit 30 surrounds the central pipe 40 and is mounted on the outer sidewall of the central pipe 40. The filter medium unit 30 can be a reverse osmosis membrane, a nanofiltration, or another filter medium applicable to the present filter element structure. As shown in FIG. 1, a raw water passage V1, a pure water passage V2, and a wastewater passage V3 are formed in the filter element 2. The filter element 2 is mounted to the local manifold 1 1 hermetically by a first seal S1, a second seal S2, and a third seal S3 in a detachable manner to prevent mixing between raw water, pure water, and wastewater and to prevent water leakage.

Figure 2:
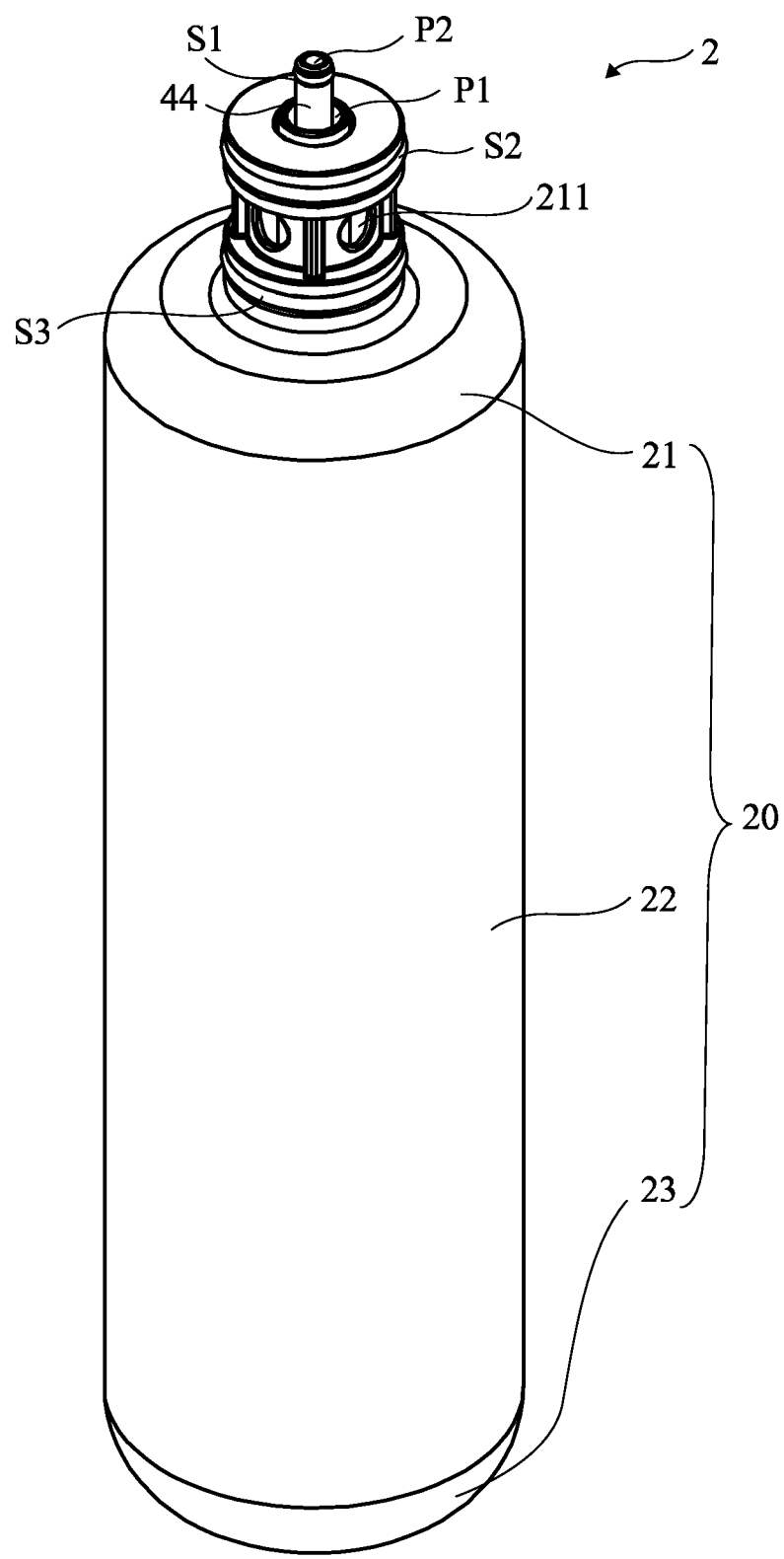
FIG. 2 is a perspective view of a filter element of the filter according to a first embodiment of the present invention.

FIG. 2 shows a perspective view of the filter element 2. As shown in FIG. 2, the filter element 2 is provided with a water inlet 211, a pure water outlet P1, and a wastewater outlet P2. The filter element housing part 20 of the filter element 2 includes a filter element housing top cover 21, a filter element housing 22, and a filter element housing bottom cover 23. In this exemplary embodiment, the filter element housing top cover 21 is hermetically attached to an upper end part of the filter element housing 22 in a detachable manner, and the filter element housing 22 is integrally formed with the filter element housing bottom cover 23. However, the present invention is not limited thereto. In another possible modification of the present invention, the filter element housing bottom cover 23 may be hermetically attached to a lower end part of the filter element housing 22 in a detachable or non-detachable manner. In another possible modification of the present invention, the filter element housing top cover 21 may be integrally formed with the filter element housing 22, and the filter element housing bottom cover 23 is hermetically attached to the lower end part of the filter element housing 22 in a detachable manner. Through the above detachable connections between the filter element housing top cover 21, the filter element housing 22, and the filter element housing bottom cover 23, components (e.g., the filter medium unit 30, the components of the central pipe 40, and the seals) that are accommodated in the filter element housing part 20 can be replaced, repaired, and so on as required, so that it is unnecessary to replace the entire filter element 2, thereby prolonging the service life of the filter element 2 and further reducing costs.

Figure 3:
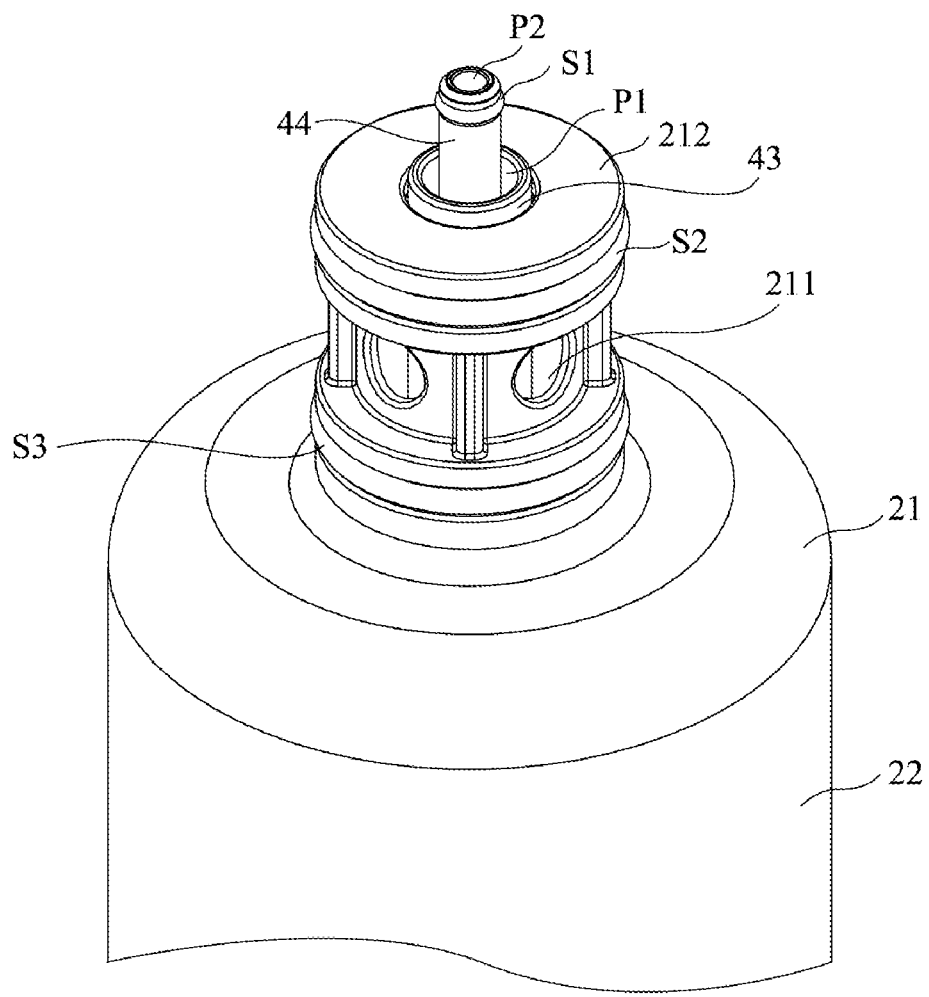
FIG. 3 is a partial enlarged perspective view of the filter element shown in FIG. 2.

FIG. 3 shows a partial enlarged view of the filter element housing top cover 21 of the filter element 2 in FIG. 2. As shown in FIG. 2 and preferably as shown in FIG. 3, the pure water outlet P1 surrounds the wastewater outlet P2 and is positioned at the radially outer side of the wastewater outlet P2. In this preferred example, the pure water outlet P1 and the wastewater outlet P2 are disposed concentrically, and the wastewater outlet P2 is positioned at the center of the filter element 2. However, it should be noted that the present invention is not limited thereto. In another possible example of the present invention, the pure water outlet P1 and the wastewater outlet P2 may be disposed non-concentrically, and the wastewater outlet P2 may not be positioned at the center of the filter element 2. The water inlet 211 is disposed on the peripheral wall of an upper part of the filter element housing top cover 21. When viewed from the longitudinal direction of the filter element 2 (the vertical direction in FIG. 2 and FIG. 3), the water inlet 211 is positioned at the radially outer side of the wastewater outlet P2 and pure water outlet P1.

Figure 4:
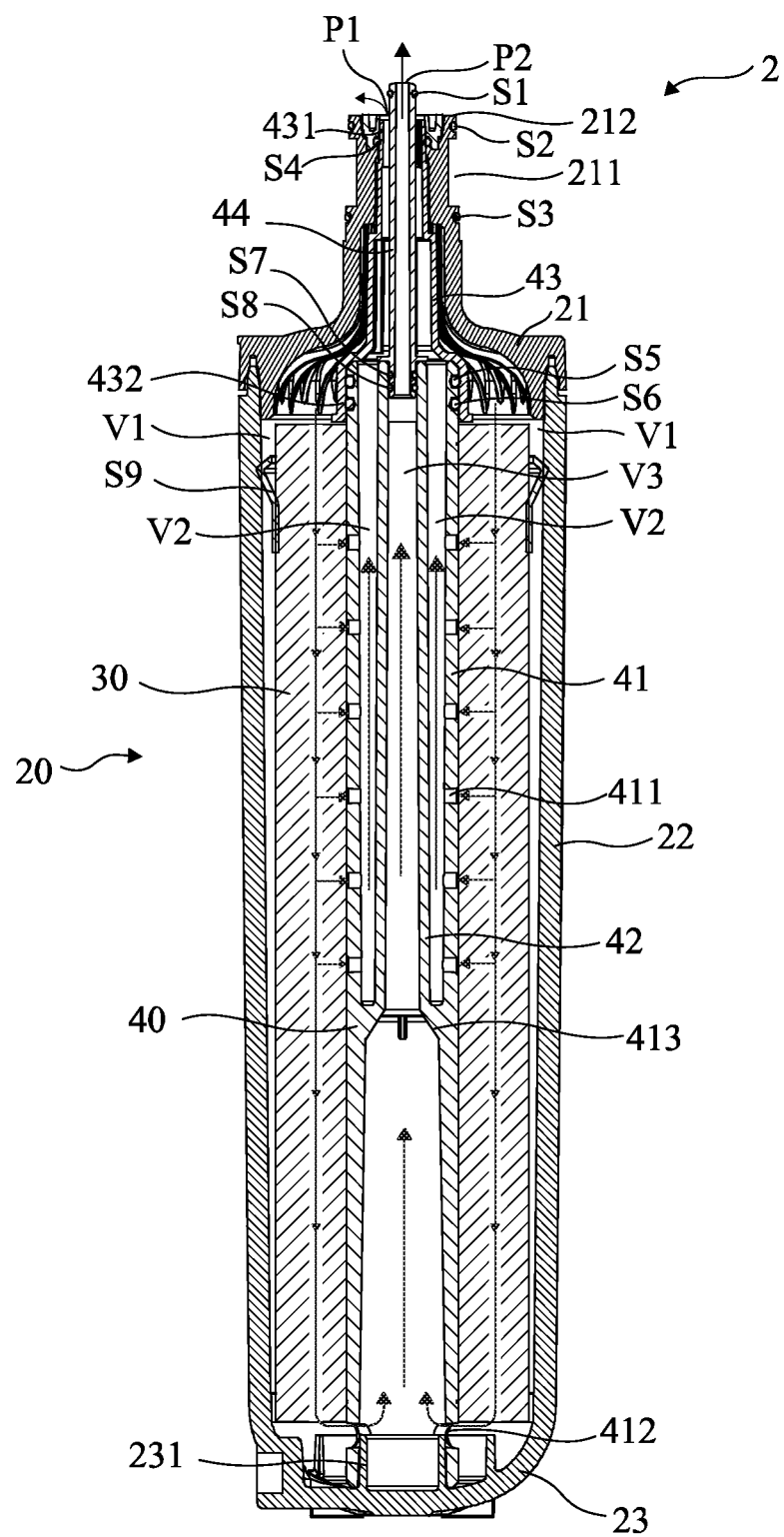
FIG. 4 is a sectional view of the filter cartridge shown in FIG. 2.
Figure 5:
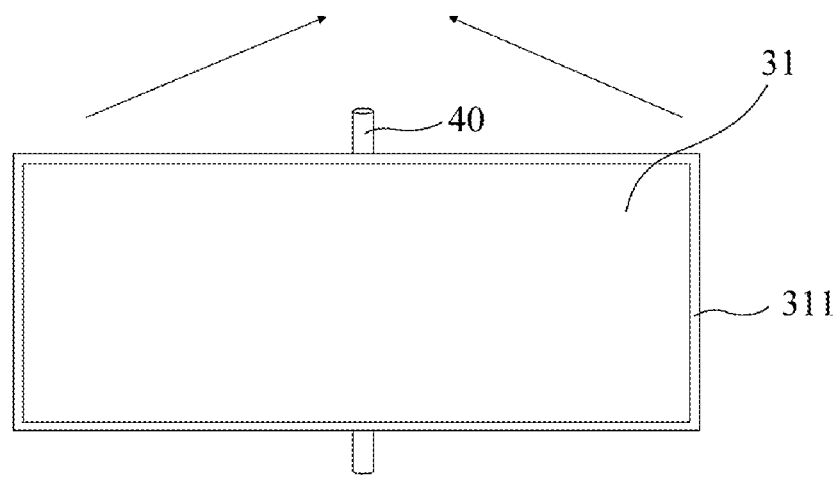
FIG. 5 to FIG. 7 schematically show mounting of a filter medium unit of the filter element.
Figure 6:
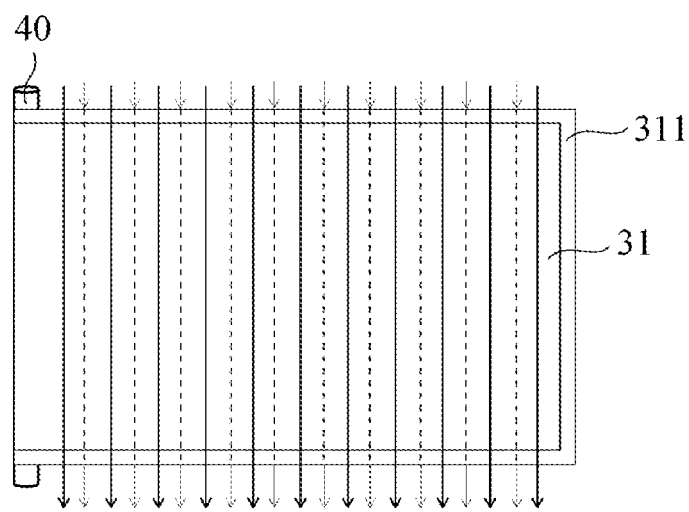
Figure 7:
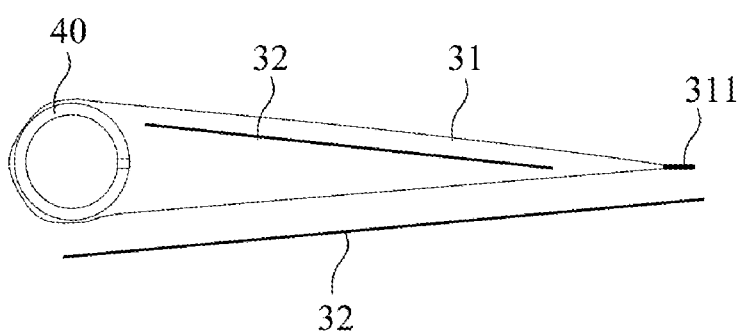

FIG. 4 shows a sectional view of the filter element 2 in FIG. 2. As shown in FIG. 4, the filter medium unit 30 and the central pipe 40 are accommodated in the filter element housing part 20 of the filter element 2. An annular positioning boss 231 is disposed on the inner surface of the filter element housing bottom cover 23, and the positioning boss 231 and the filter element housing 22 are disposed concentrically. A lower end part of the central pipe 40 is mounted on the positioning boss 231 such that the central pipe 40 and the filter element housing 22 are mounted concentrically. The filter medium unit 30 surrounds the central pipe 40 and is mounted on the outer side wall of the central pipe 40. The outer diameter of the filter medium unit 30 is slightly smaller than the inner diameter of the filter element housing 22, and the height of the filter medium unit 30 is lower than the height of an inner cavity of the filter element housing, so that the filter medium unit 30 and the inner wall of the housing of the filter element 2 are spaced apart from each other to form a gap space. The filter medium unit 30 can be a reverse osmosis membrane, a nanofiltration, or another filter medium applicable to the present filter element structure. FIG. 5 to FIG. 7 schematically show mounting of the filter medium unit 30 to the central pipe 40. In an example where the filter medium unit 30 is a reverse osmosis membrane, a reverse osmosis membrane having a predetermined size is first selected in order to mount the filter medium unit 30 to the central pipe 40. The width and the length of the reverse osmosis membrane are selected such that when the reverse osmosis membrane is wrapped to the central pipe 40, the reverse osmosis membrane is capable of covering at least all pure water collecting holes provided on the central pipe 40, and the outer diameter of the filter medium unit 30 formed by the reverse osmosis membrane is slightly smaller than the inner diameter of the filter element housing 22. Then, as shown in FIG. 5, the reverse osmosis membrane 31 is folded around the central pipe 40 in directions shown by the arrows, wherein the periphery 311 of the reverse osmosis membrane 31 is bonded together. Then, as shown in FIG. 6, the periphery 311 of the folded reverse osmosis membrane 31 is stitched together to form a closed pocket, and the central pipe 40 is wrapped in the formed pocket. The arrows in FIG. 6 schematically show the flow of wastewater along the surface of the reverse osmosis membrane 31 when raw water is supplied to the reverse osmosis membrane 31. The solid lines indicate the flow of the wastewater along one side surface of the reverse osmosis membrane 31, and the broken lines indicate the flow of the wastewater along the other side surface of the reverse osmosis membrane 31. Preferably, in order to prevent adhesion of the surfaces of the folded reverse osmosis membrane 31 facing each other, a grid-like flow guide cloth 32 is provided between the surfaces of the reverse osmosis membrane 31 facing each other and on the outer surface of one side of the reverse osmosis membrane 31, as shown in FIG. 7. The flow guide cloth 32 and the reverse osmosis membrane 31 are stitched together in the process of stitching the periphery 311 of the folded reverse osmosis membrane 31 together. Then, the reverse osmosis membrane 31 to which the flow guide cloth 32 is stitched is wound around the central pipe 40 to form the filter medium unit 30. When the raw water is supplied to the filter medium unit 30, the raw water flows into the filter medium unit 30 from an upper end of the filter medium unit 30. A part of the water flows along the surface of the reverse osmosis membrane 31 of the filter medium unit 30, and flows out of the filter medium unit 30 from a lower end of the filter medium unit 30 so as to form wastewater. The other part of the water penetrates the reverse osmosis membrane 31 in the process of flowing, and flows into the central pipe 40 through the pure water collecting holes on the central pipe 40 so as to form pure water. The reverse osmosis membrane 31 may be any type of reverse osmosis membrane commercially available, for example, it may be a reverse osmosis membrane manufactured and sold by reverse osmosis membrane manufacturers such as Dow, GE, CSM, and Toray.

Please refer to FIG. 4 again. A Y-type wastewater seal ring S9 is mounted around the filter medium unit 30 and abuts against the inner wall of the filter element housing 22, thereby hermetically dividing the gap space between the filter medium unit 30 and the inner wall of the housing of the filter element 2 into upper and lower portions, wherein the space positioned above forms the raw water passage V1, thereby preventing the untreated raw water in the filter element 2 from being mixed into the wastewater. Preferably, the Y-type wastewater seal ring S9 is mounted around the upper part of the filter medium unit 30 so as to define the raw water passage V1 to be as close as possible to the upper end part of the filter medium unit 30, so as to improve the filtration efficiency of the filter M1. The space between the inner wall of the housing of the filter element 2 and the filter medium unit 30 forms a first part of the raw water passage V1.

Figure 8:
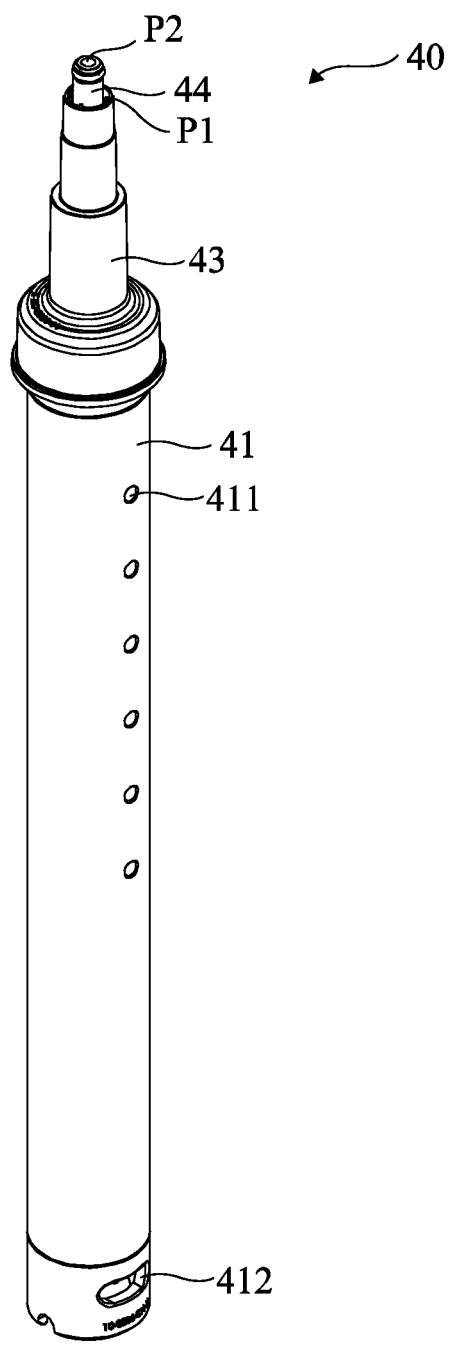
FIG. 8 is a perspective view of a central pipe of the filter element shown in FIG. 2, the central pipe being positioned in a filter element housing part and in the filter medium unit.
Figure 9:
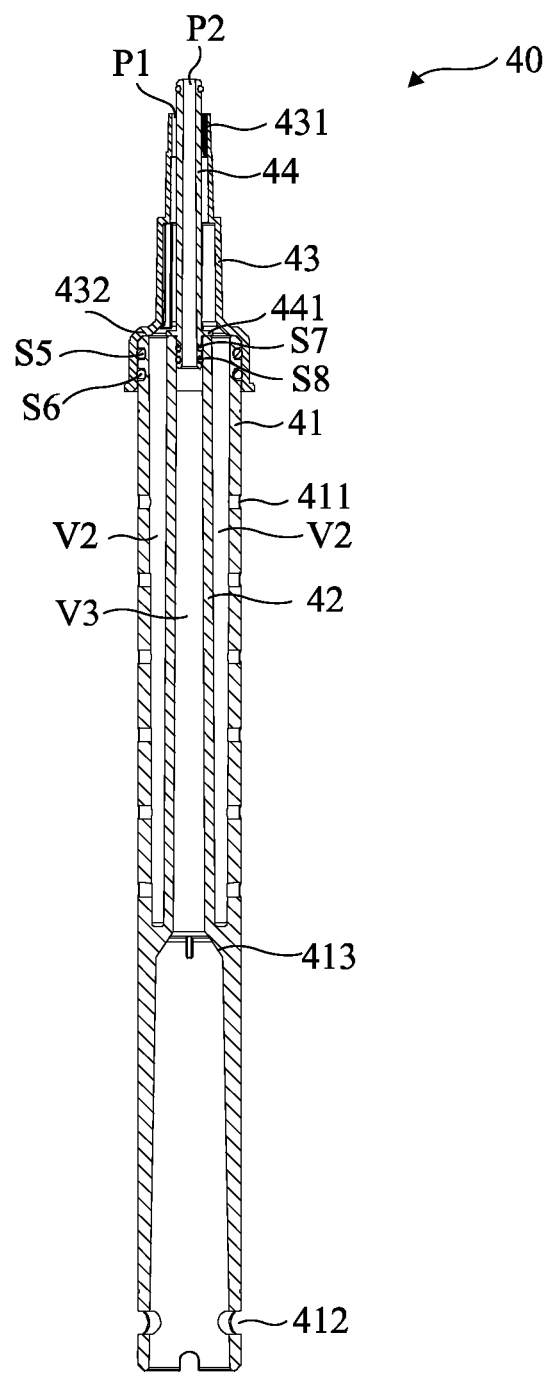
FIG. 9 is a sectional view of the central pipe shown in FIG. 8.

FIG. 8 and FIG. 9 show the central pipe 40. FIG. 8 shows a perspective view of the central pipe 40, while FIG. 9 shows a sectional view of the central pipe 40. As shown in FIG. 8 and FIG. 9, the central pipe 40 includes a pure water collecting pipe 41 and a wastewater collecting pipe 42. The pure water collecting pipe 41 is provided with a plurality of pure water collecting holes 411 which penetrate the pipe wall of the pure water collecting pipe 41. A pure water outlet pipe is attached to an upper end part of the pure water collecting pipe 41 (that is, a first end part of the pure water collecting pipe 41). In this embodiment, the pure water outlet pipe is a central pipe adapter 43. The central pipe adapter 43 is a stepped tubular structure, and has a first end part 432 having a larger diameter and a second end part 431 having a smaller diameter. The central pipe adapter 43 is mounted to extend in the filter element housing part 20, particularly in the filter element housing top cover 21. The second end part 431 forms a pure water outlet P1 and is substantially flush with an end part 212 of the filter element housing top cover 21. Moreover, a fourth seal S4 is mounted between the outer wall of the second end part 431 and the inner wall of the filter element housing top cover 21 (see FIG. 4). The first end part 432 is hermetically attached to the upper end part of the pure water collecting pipe 41 by a fifth seal S5 and a sixth seal S6. Therefore, the space between the outer wall of the central pipe adapter 43 and the inner wall of the filter element housing part 20 forms a second part of the raw water passage V1.

The wastewater collecting pipe 42 is at least partially disposed in the pure water collecting pipe 41. In this preferred example, the pure water collecting pipe 41 and the wastewater collecting pipe 42 are disposed concentrically. However, it should be noted that the present invention is not limited thereto. In another possible example of the present invention, the pure water collecting pipe 41 and the wastewater collecting pipe 42 may be disposed non-concentrically. A lower end part of the wastewater collecting pipe 42 (that is, a second end part of the concentrated water collecting pipe 42) is integrally formed to the pipe wall of the pure water collecting pipe 41. In this example, in order to facilitate the manufacture of the central pipe 40, the lower end part of the wastewater collecting pipe 42 is integrally formed to a middle part of the pure water collecting pipe 41, instead of being integrally formed to a lower end part of the pure water collecting pipe 41. It should be noted that, while facilitating the manufacture of the central pipe 40, the lower end part of the wastewater collecting pipe 42 should be as close as possible to the lower end part of the pure water collecting pipe 41, so that the wastewater collecting pipe 42 extends over a major part of the length of the pure water collecting pipe 41, thus facilitating the formation of an elongated configuration. In addition, as shown in FIG. 9, a truncated-conical structure is formed between the lower end part of the wastewater collecting pipe 42 and the pure water collecting pipe 41 to cause a smoother flow of the fluid in the central pipe 40. In this embodiment, the truncated-conical structure is a truncated-conical port 413. The space in a part of the pure water collecting pipe 41 positioned below the port 413 forms a first part of the wastewater passage V3. The space inside the wastewater collecting pipe 42 forms a second part of the wastewater passage V3. The lower end part of the central pipe 40 is provided with a wastewater inlet 412. The wastewater inlet 412 is designed such that when the central pipe 40 is mounted on the positioning boss 231 (see FIG. 4), the wastewater inlet 412 is not completely blocked by the positioning boss 231, so that wastewater can flow into the wastewater passage V3 through the wastewater inlet 412.

An upper end part of the wastewater collecting pipe 42 (that is, a first end part of the wastewater collecting pipe 42) is suspended with respect to the pure water collecting pipe 41, and the wastewater collecting pipe 42 is spaced apart from the pure water collecting pipe 41. The space between the pure water collecting pipe 41 and the wastewater collecting pipe 42 forms a first part of the pure water passage V2, and the pure water collecting holes 411 are provided at a part of the pure water collecting pipe 41 above the port 413 (the part opposite to the wastewater collecting pipe 42). The pure water enters the pure water passage V2 through the pure water collecting holes 411. A wastewater outlet pipe 44 is attached to the upper end part of the wastewater collecting pipe 42. A lower end part of the wastewater outlet pipe 44 (i.e., a first end part of the wastewater outlet pipe 44) is hermetically attached (e.g., plugged) to the upper end part of the wastewater collecting pipe 42 in a detachable manner. The lower end part of the wastewater outlet pipe 44 is hermetically attached to the upper end part of the wastewater collecting pipe 42 by a seventh seal S7 and an eighth seal S8. A positioning flange 441 is formed at the lower end part of the wastewater outlet pipe 44. When the lower end part of the wastewater outlet pipe 44 is attached to the upper end part of the wastewater collecting pipe 42, the positioning flange 441 is placed on the upper end part of the wastewater collecting pipe 42 to prevent the wastewater outlet pipe 44 from being deeply inserted into the wastewater collecting pipe 42. An upper end part of the wastewater outlet pipe 44 (i.e., a second end part of the wastewater outlet pipe 44) forms a wastewater outlet P2 and protrudes from the end part 212 of the filter element housing top cover 21, so that the pure water outlet P1 and the wastewater outlet P2 are staggered in the longitudinal direction (the vertical direction in FIG. 4) of the filter element 2. Hence, the space between the central pipe adapter 43 and the wastewater outlet pipe 44 forms a second part of the pure water passage V2, and the space inside the wastewater outlet pipe 44 forms a third part of the wastewater passage V3.

In the filter element 2, the pure water collecting pipe 41 and the central pipe adapter 43 constitute a pure water pipeline, and the wastewater collecting pipe 42 and the wastewater outlet pipe 44 constitute a wastewater pipeline. The wastewater pipeline has an elongated configuration and forms a cantilever structure. The raw water passage V1 is at least partially formed between the outer wall of the pure water pipeline and the inner wall of the filter element housing part 20; the pure water passage V2 is at least partially formed between the inner wall of the pure water pipeline and the outer wall of the wastewater pipeline; and the wastewater passage V3 is at least partially formed in the wastewater pipeline.

Since the pure water collecting pipe 41 and the wastewater collecting pipe 42 are disposed to be concentric with each other, the central pipe adapter 43 attached to the pure water collecting pipe 41 and the wastewater outlet pipe 44 attached to the wastewater collecting pipe 42 are also disposed to be concentric with each other. In addition, as described above, the central pipe 40 and the filter element housing 22 are disposed concentrically. Therefore, in this preferred example, the wastewater pipeline is concentrically disposed in the pure water pipeline such that the wastewater passage V3, the pure water passage V2, and the raw water passage V1 are arranged to be concentric with one another, and are concentrically arranged sequentially from the center to the circumference along a radial direction (the horizontal direction in the drawing) of the filter element 2. In a radial direction of the filter element 2, the wastewater passage V3 is positioned at the center, the raw water passage V1 is positioned on the outer side, and the pure water passage V2 is positioned between the raw water passage V1 and the wastewater passage V3. Through the above arrangement, the structure of the filter element 2 is simplified, and the quantity of components is reduced, thereby reducing manufacturing costs. In addition, the above concentric arrangement of the wastewater passage V3, the pure water passage V2, and the raw water passage V1 facilitates the positioning of the pure water outlet P1 and the wastewater outlet P2. Furthermore, the concentric arrangement is conducive to the alignment of the filter element 2 to the corresponding part of the local manifold 1 1, and simplifies the mounting of the filter element 2.

The structures of the filter M1 and the filter element 2 thereof according to the first embodiment of the present invention are described in detail above. The fluid flow in the operating process of the filter M1 will be described below with reference to FIG. 1 and FIG. 4 again.

In the operating process of the filter M1, raw water to be treated (for example, municipal tap water) enters the filter M1 through the raw water port 11 of the local manifold 1 1, as shown by an arrow K1 in FIG. 1. Then, the raw water entering the filter M1 enters the raw water passage V1 in the filter element 2 through the water inlet 211 on the filter element 2. The raw water in the raw water passage V1 flows through the filter medium unit 30 as shown by long lines with arrows in FIG. 1 and FIG. 4. The pure water flowing through the filter medium unit 30 and radially penetrating the filter medium unit 30 flows into the pure water passage V2 in the central pipe 40 through the pure water collecting holes 411 on the pipe wall of the pure water collecting pipe 41, as shown by short lines with arrows in FIG. 1 and FIG. 4. In addition, the water flowing through the filter medium unit 30, along the longitudinal direction of the filter medium unit 30 but not penetrating the filter medium unit 30 along a radial direction, forms wastewater, and the wastewater flows into the wastewater passage V3 in the central pipe 40 through the wastewater inlet 412, as shown by curves with arrows in the drawings. The pure water in the pure water passage V2 flows out of the filter element 2 through the pure water outlet P1, and flows out of the filter M1 through the pure water port 12 on the local manifold 1 1, as shown by an arrow K2 in FIG. 1. The wastewater in the wastewater passage V3 flows out of the filter element 2 through the wastewater outlet P2, and flows out of the filter M1 through the wastewater port 13 on the local manifold 1 1, as shown by an arrow K3 in FIG. 1.

In the filter M1 according to the first embodiment of the present invention, the water inlet 211 of the filter element 2 is in communication with the raw water port 11 on the local manifold 11; the wastewater outlet P2 of the filter element 2 is in communication with the wastewater port 13 on the local manifold 1 1; and the pure water outlet P1 of the filter element 2 is in communication with the pure water port 12 on the local manifold 11. By the correspondingly disposed seals, the water inlet 211 of the filter element 2 is hermetically aligned with the raw water port 11 on the local manifold 1 1; the wastewater outlet P2 of the filter element 2 is hermetically mounted to the wastewater port 13 on the local manifold 1 1; and the pure water outlet P1 of the filter element 2 is hermetically mounted to the pure water port 12 on the local manifold 1 1, thus preventing mixing and leakage of the raw water supplied in the operating process of the filter M1, the wastewater obtained by the treatment, and the pure water. By the first seal S1 disposed between the upper end part of the wastewater outlet pipe 44 and the local manifold 1 1, when the filter element 2 is mounted to the local manifold 1 1 of the filter M1, the wastewater flowing out of the wastewater outlet P2 can be prevented from leaking and being mixed into the pure water in the operating process of the filter M1. By the second seal S2 and the third seal S3 disposed between the outer peripheral wall of the filter element housing top cover 21 and the local manifold 1 1, when the filter element 2 is mounted to the local manifold 1 1 of the filter M1, in the operating process of the filter M1, the second seal S2 can prevent the raw water flowing in through the raw water port 11 from being mixed into the pure water and prevent the pure water flowing out of the pure water outlet P1 from being mixed into the raw water, and the third seal S3 can prevent the raw water flowing in through the raw water port 11 from leaking to the outside of the filter. By the fourth seal S4 disposed between the second end part 431 of the central pipe adapter 43 and the filter element housing top cover 21, as well as the fifth seal S5 and the sixth seal S6 disposed between the second end part 432 of the central pipe adapter 43 and the pure water collecting pipe 41, leakage and mixing of the raw water and the pure water in the filter element 2 are prevented. By the seventh seal S7 and the eighth seal S8 disposed between the lower end part of the wastewater outlet pipe 44 and the upper end part of the wastewater collecting pipe 42, leakage and mixing of the wastewater and the raw water in the filter element 2 are prevented. Further, the Y-type wastewater seal ring S9 disposed between the filter medium unit 30 and the filter element housing 22 prevents the wastewater from flowing back to the raw water passage V1, thereby preventing leakage and mixing of the raw water and wastewater in the filter element 2.

In the filter M1 according to the first embodiment of the present invention, the wastewater passage V3 is positioned at the center of the filter element 2 of the filter M1. The wastewater passage V3, the pure water passage V2, and the raw water passage V1 that are concentrically arranged sequentially from the center to the circumference along a radial direction of the filter element 2 are formed in the central pipe 40. With such arrangement, on one hand, the structure of the filter element 2 can be simplified, the quantity of components can be reduced, the cost can be reduced, the structures of the filter element 2 and the filter M1 can be made more compact, and the space occupied can be reduced. On the other hand, such arrangement allows alignment of the filter element 2 to the corresponding part of the local manifold 1 1 to be easily achieved when it is mounted to the local manifold 1 1, thus simplifying the mounting and replacement of the filter element 2.

In addition, the filter M1 according to the first embodiment of the present invention can also achieve further advantages.

In the filter M1, the wastewater pipeline formed by the wastewater outlet pipe 44 and the wastewater collecting pipe 42 has an elongated configuration to form a cantilever structure that can provide certain flexibility. Therefore, the wastewater pipeline can be moderately shaken and bent within a certain range when subjected to a force, which is very advantageous for the mounting of the filter element 2 to the local manifold 1 1 of the filter M1. As described above, the wastewater outlet pipe 44 extends out of the filter element housing top cover 21. When the filter element 2 is mounted to the local manifold 1 1 of the filter M1, the wastewater outlet pipe 44 needs to be fitted to the wastewater port 13 in the local manifold 1 1. The fitting of the wastewater outlet pipe 44 and the wastewater port 13 of the local manifold 1 1 is very important for the mounting of the filter element 2. If the wastewater pipeline formed by the wastewater collecting pipe 42 and the wastewater outlet pipe 44 cannot provide the aforementioned flexibility, the filter element 2 is required to have a high manufacturing precision for precisely matching the corresponding part of the local manifold 1 1 when it is mounted to the local manifold 1 1. Otherwise, once a positional deviation between the filter element 2 and the local manifold 1 1 exists, such that the wastewater outlet P2 of the filter element is misaligned with the wastewater port 13 on the local manifold 1 1, it is difficult to mount the filter element 2 to the local manifold 1 1. Even if the filter element 2 is mounted to the local manifold 1 1 arduously, the first seal S1 at the upper end part of the wastewater outlet pipe 44 of the filter element 2 is subjected to a large force due to the rigidity of the wastewater outlet pipe 44, and the subjected force is uneven with a larger force subjected on one side, so that the first seal S1 is prone to wear. Moreover, this even causes the seventh seal S7 and the eighth seal S8 at the lower end part of the wastewater outlet pipe 44 to be prone to wear due to unevenly subjected forces, thus resulting in leakage and mixing of the wastewater and the pure water.

In the filter element 2, the above flexibility provided by the elongated cantilever structure of the wastewater pipeline can allow a certain positional error when the filter element 2 is mounted to the local manifold 1 1, without having to cause the wastewater outlet P2 of the filter element 2 to be strictly aligned with the wastewater port 13 of the local manifold 1 1. Therefore, even if a positional error within the error range exists, the wastewater outlet pipe 44 can be moved within a certain range to be fitted to the wastewater port 13 of the local manifold 1 1 because of the above flexibility provided by the elongated configuration of the wastewater pipeline, thereby avoiding mounting difficulties; damages of the first seal member S1, the seventh seal member S7, and the eighth seal member S8; or leakage and mixing of the wastewater and the pure water. Therefore, by providing the above mounting flexibility for the wastewater pipeline of the filter element 2, the requirements on the manufacturing precision of the local manifold 1 1 and the filter element 2 can be reduced, and the manufacturing cost can be further reduced. In addition, when a user replaces the filter element 2 as required, the wastewater outlet P2 is easily fitted to the wastewater port 13 of the local manifold 11 because of the above mounting flexibility. Therefore, the replacement and the mounting of the filter element 2 are easier to operate; wearing of the first seal S1, the seventh seal S7, and the eighth seal S8 due to unevenly subjected forces during the mounting can be prevented; and leakage at corresponding positions is also prevented.

The wastewater outlet pipe 44 may be made of the same material as the wastewater collecting pipe 42, but preferably, the wastewater outlet pipe 44 is made of a material more flexible than that of the wastewater collecting pipe 42 of the central pipe 40, so as to more advantageously provide the aforementioned flexibility. In the first embodiment according to the present invention, the central pipe 40 is made of a polymer material. However, the present invention is not limited thereto, and in other modifications of the present invention, the central pipe 40 may also be made of other materials.

Second Embodiment

A filter M2 and a filter element 2A thereof according to a second embodiment of the present invention will be described below with reference to FIG. 10 to FIG. 13.

The filter M2 and the filter element 2A thereof according to the second embodiment of the present invention have substantially the same structures as the filter M1 and the filter element 2 thereof according to the first embodiment of the present invention. The difference mainly lies in the configuration of the central pipe of the filter element. Therefore, in the accompanying drawings and the following, the same components are represented by the same reference numerals, and the corresponding descriptions are omitted. Major differences between the filter element 2A and the filter element 2 will be described below.

Figure 10:
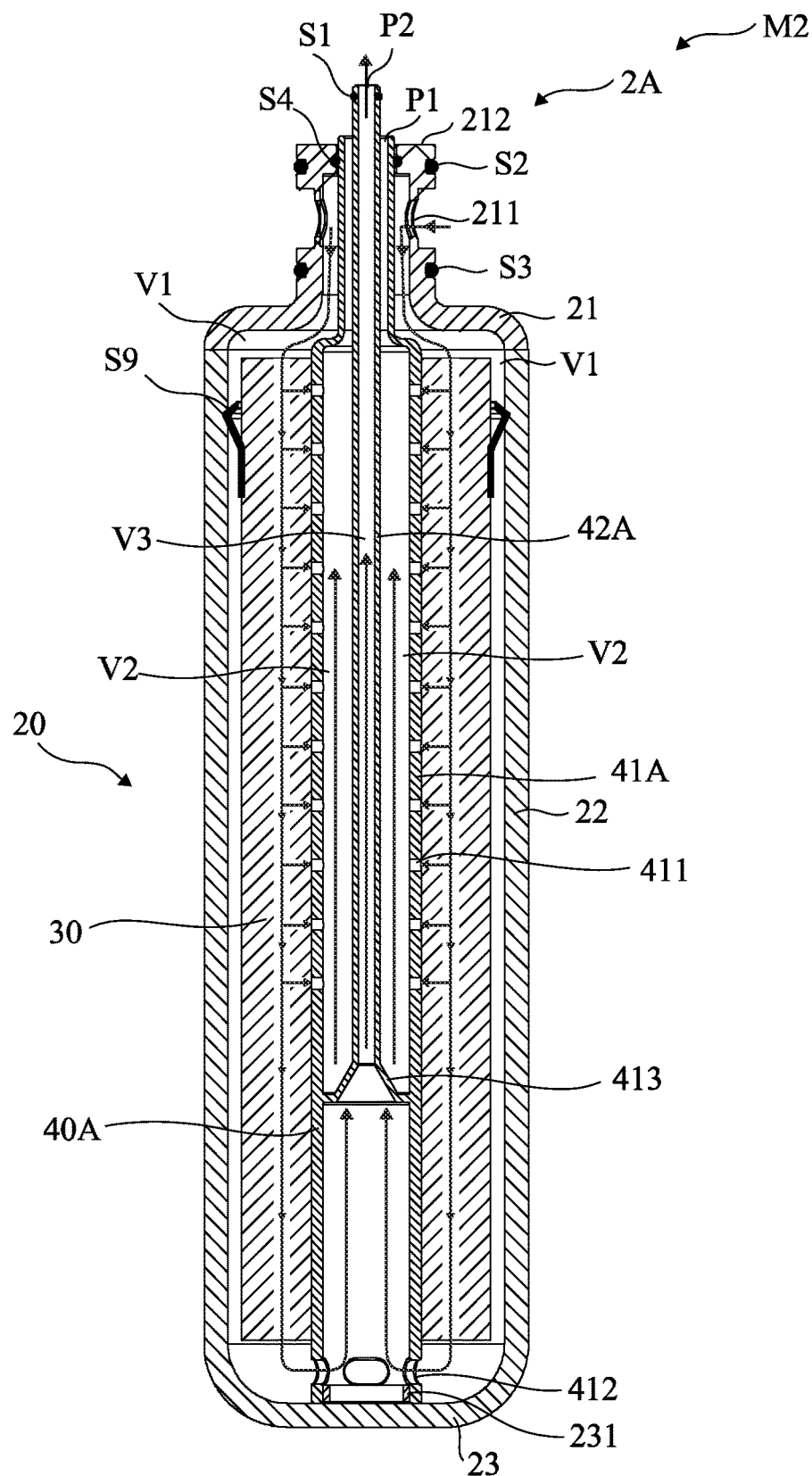
FIG. 10 is a sectional view of a filter element of a filter according to a second embodiment of the present invention.

FIG. 10 shows a sectional view of the filter element 2A of the filter M2 according to the second embodiment of the present invention, wherein an internal structure of the filter element 2A is shown. As shown in FIG. 10, a filter medium unit 30 and a central pipe 40A are accommodated in a filter element housing part 20 of the filter element 2A. A raw water passage V1, a pure water passage V2, and a wastewater passage V3 are formed in the central pipe 40A. A lower end part of the central pipe 40A is mounted on an annular positioning boss 231 provided on the inner surface of a filter element housing bottom cover 23, such that the central pipe 40A and the filter element housing 22 are mounted concentrically. The central pipe 40A includes a pure water collecting pipe 41A and a wastewater collecting pipe 42A. The space in a part of the pure water collecting pipe 41A positioned below a port 413 forms a first part of the wastewater passage V3. The space inside the wastewater collecting pipe 42A forms a second part of the wastewater passage V3. A lower end part of the central pipe 40A is provided with a wastewater inlet 412. The wastewater inlet 412 is designed such that when the central pipe 40A is mounted on the positioning boss 231, the wastewater inlet 412 is not completely blocked by the positioning boss 231, so that wastewater can flow into the wastewater passage V3 through the wastewater inlet 412. A Y-type wastewater seal ring S9 is mounted around the filter medium unit 30 and abuts against the inner wall of the filter element housing 22 to define the raw water passage V1 together with the pure water collecting pipe 41A of the central pipe 40A and the filter element housing part 20. The space between the inner wall of the housing of the filter element 2A and the filter medium unit 30 forms a first part of the raw water passage V1, and the space between the inner wall of the housing of the filter element 2A and the outer wall of the pure water collecting pipe 41A forms a second part of the raw water passage V1. The pure water outlet P1 is disposed around the wastewater outlet P2 and is positioned on the radially outer side of the wastewater outlet P2. In this preferred example, the pure water outlet P1 and the wastewater outlet P2 are disposed concentrically, and the wastewater outlet P2 is positioned at the center of the filter element 2A. However, it should be noted that the present invention is not limited thereto. In other possible examples of the present invention, the pure water outlet P1 and the wastewater outlet P2 may be disposed non-concentrically, and the wastewater outlet P2 may not be positioned at the center of the filter element 2A. The water inlet 211 is disposed on the peripheral wall of an upper part of the filter element housing top cover 21. When viewed from the longitudinal direction of the filter element 2A (the vertical direction in FIG. 10), the water inlet 211 is positioned at the radially outer side of the wastewater outlet P2 and the pure water outlet P1.

Figure 11:
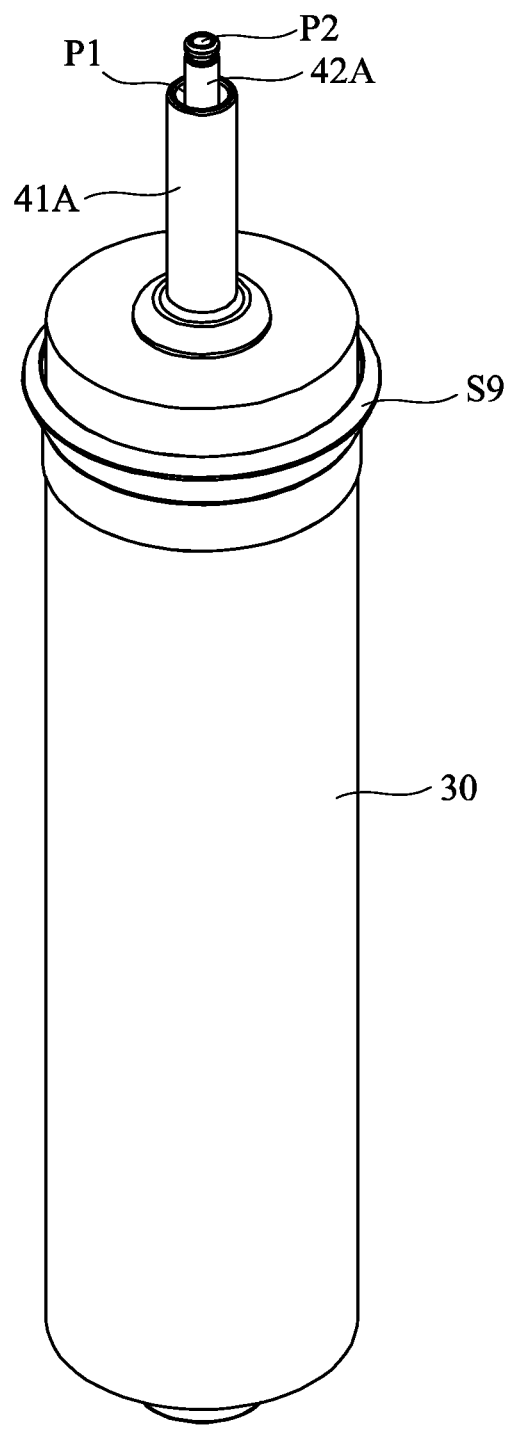
FIG. 11 is a perspective view of a part of the filter element shown in FIG. 10 after a filter element housing part is removed.

FIG. 11 shows a perspective view of a part of the filter element 2A after the filter element housing part 20 is removed. As shown in FIG. 11, the Y-type wastewater seal ring S9 surrounds the filter medium unit 30 and is mounted on an upper part of the filter medium unit 30. The filter medium unit 30 surrounds the central pipe 40A and is mounted on the outer side wall of the central pipe 40A.

Figure 12:
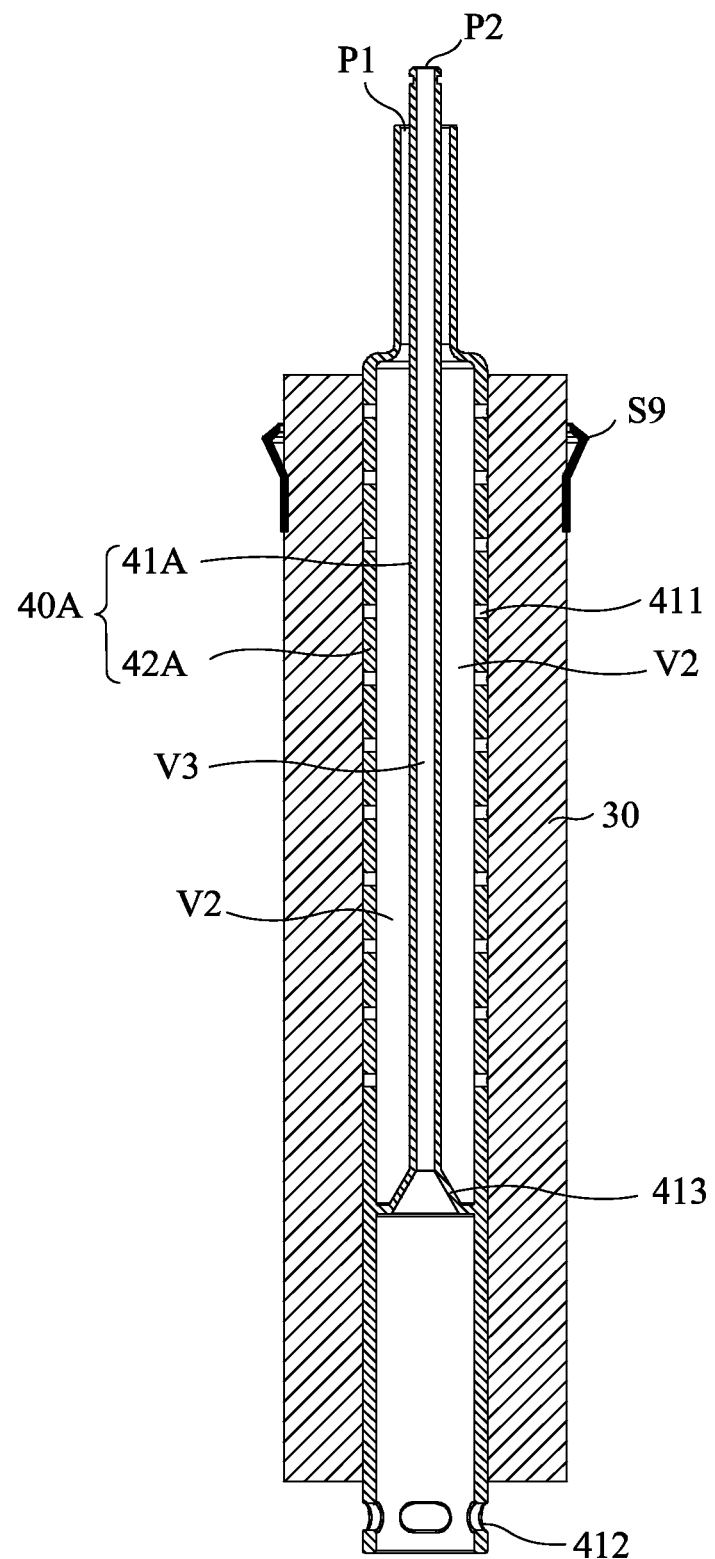
FIG. 12 is a sectional view of the part shown in FIG. 11.
Figure 13:
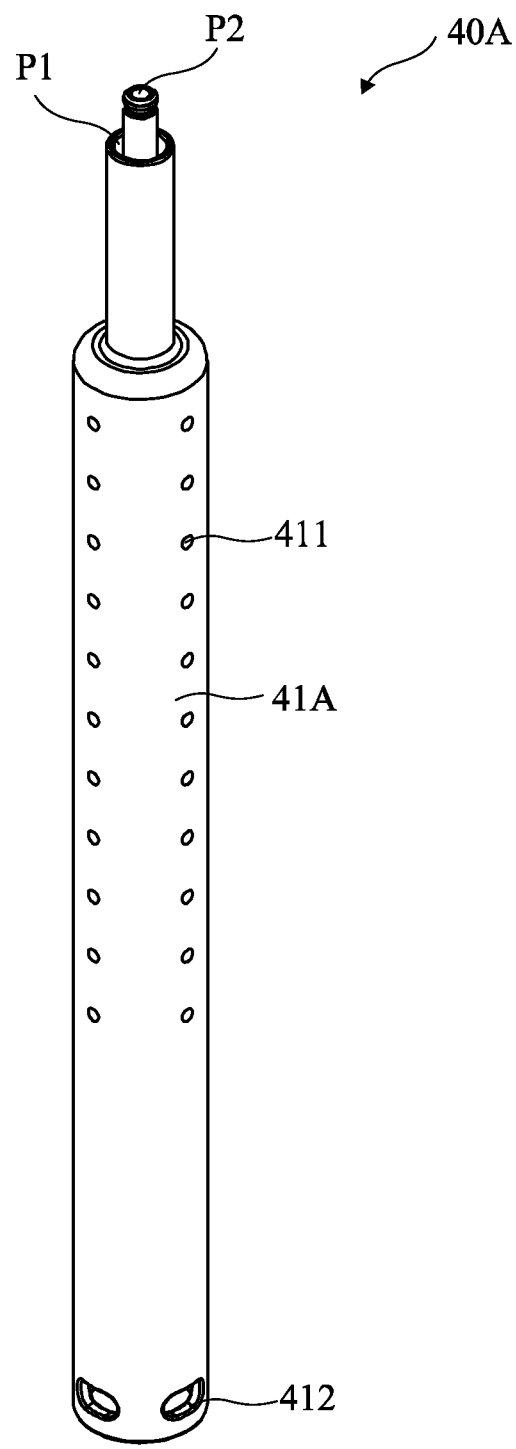
FIG. 13 is a perspective view of a central pipe of the filter element shown in FIG. 10.

FIG. 12 shows a sectional view of the part shown in FIG. 11, and FIG. 13 shows a perspective view of the central pipe 40A. As shown in FIG. 12 and FIG. 13, the central pipe 40A includes the pure water collecting pipe 41A and the wastewater collecting pipe 42A. The pure water collecting pipe 41A is a stepped tubular structure, and has an upper part having a smaller diameter and a lower part having a larger diameter. The filter medium unit 30 surrounds the central pipe 40A and is mounted on the lower part having a larger diameter of the pure water collecting pipe 41A, and a plurality of pure water collecting holes 411 are formed on the pipe wall of the lower part having a larger diameter of the pure water collecting pipe 41A. The pure water collecting holes 411 penetrate the pipe wall of the pure water collecting pipe 41A. The upper part having a smaller diameter of the pure water collecting pipe 41A extends to be substantially flush with an end part 212 of the filter element housing top cover 21 to form a pure water outlet P1.

The wastewater collecting pipe 42A is concentrically disposed in the pure water collecting pipe 41A. A lower end part of the wastewater collecting pipe 42A (that is, a second end part of the wastewater collecting pipe 42A) is integrally formed to the pipe wall of the pure water collecting pipe 41A. In this example, in order to facilitate the manufacture of the central pipe 40A, the lower end part of the wastewater collecting pipe 42 is integrally formed to a middle part of the pure water collecting pipe 41A, instead of being integrally formed to a lower end part of the pure water collecting pipe 41A. It should be noted that, while facilitating the manufacture of the central pipe 40A, the lower end part of the wastewater collecting pipe 42A is as close as possible to the lower end part of the pure water collecting pipe 41A, so that the wastewater collecting pipe 41A extends over a major part of the length of the pure water collecting pipe 41A, and it facilitates the formation of an elongated configuration of the wastewater collecting pipe 42A.

The upper end part of the wastewater collecting pipe 42A is suspended with respect to the pure water collecting pipe 41A, and the upper end part of the wastewater collecting pipe 42A extends to protrude from the end part 212 of the filter element housing top cover 21, to form a wastewater outlet P2. The wastewater collecting pipe 42A is spaced apart from the pure water collecting pipe 41A, thereby defining a pure water passage V2 between the outer wall of the wastewater collecting pipe 42A and the inner wall of the pure water collecting pipe 41A, and defining a second part of the wastewater passage V3 in the wastewater collecting pipe 42A. The pure water outlet P1 formed between the upper end part (the end part having a smaller diameter of the upper part) of the pure water collecting pipe 41A of the central pipe 40A and the outer wall of the wastewater collecting pipe 42A and the wastewater outlet P2 formed at the upper end part of the wastewater collecting pipe 42A are staggered in the longitudinal direction of the filter element 2A.

In the filter element 2A, the upper part having a smaller diameter of the pure water collecting pipe 41A is equivalent to the pure water outlet pipe, and is integrally formed with the lower part having a larger diameter of the pure water collecting pipe 41A, so that the pure water pipeline of the filter element 2A is formed by the pure water collecting pipe 41A, and the wastewater pipeline of the filter element 2A is formed by the wastewater collecting pipe 42A. The raw water passage V1 is at least partially formed between the outer wall of the pure water collecting pipe 41A and the inner wall of the filter element housing part 20; the pure water passage V2 is at least partially formed between the inner wall of the pure water collecting pipe 41A and the outer wall of the wastewater collecting pipe 42A; the wastewater passage V3 is at least partially formed in the wastewater collecting pipe 42A; and the raw water passage V1 is not in direct communication with the pure water passage V2 and the wastewater passage V3.

Since the central pipe 40A and the filter element housing 22 are disposed concentrically, and the pure water collecting pipe 41A and the wastewater collecting pipe 42A are disposed concentrically, the raw water passage V1, the pure water passage V2, and the wastewater passage V3 are concentric with each other, and the wastewater passage V3, the pure water passage V2, and the raw water passage V1 are arranged sequentially from the center to the circumference along a radial direction of the filter element 2.

The structure of the filter element 2A of the filter M2 according to the second embodiment of the present invention has been described above. The fluid flow in the operating process of the filter M2 will be described below with reference to FIG. 10 again.

As shown by the arrowed line in FIG. 10, the raw water enters the raw water passage V1 in the filter element 2A through the water inlet 211. The raw water in the raw water passage V1 flows through the filter medium unit 30, wherein the pure water radially penetrating the filter medium unit 30 flows into the pure water passage V2 in the filter element 2A through the pure water collecting holes 411 on the pipe wall of the pure water collecting pipe 41A, as shown by short lines with arrows in FIG. 10. The water flowing through the filter medium unit 30 along the longitudinal direction of the filter medium unit 30 but not penetrating the filter medium unit 30 along a radial direction forms wastewater, and the wastewater flows into the wastewater passage V3 in the central pipe 40A through the wastewater inlet 412, as shown by curves with arrows in FIG. 10. The pure water in the pure water passage V2 flows out of the filter element 2A through the pure water outlet P1, and flows out of the filter M2 through the pure water port on the local manifold 1 (see the pure water port 12 of the local manifold 1 1 in FIG. 1). The wastewater in the wastewater passage V3 flows out of the filter element 2A through the wastewater outlet P2, and flows out of the filter M2 through the wastewater port on the local manifold 1 (see the wastewater port 13 on the local manifold 1 1 in FIG. 1).

In addition, in the filter element 2A, the wastewater collecting pipe 42A is formed into an elongated tubular structure. Before the filter element 2A is mounted to the local manifold 1 of the filter M2, only the lower end part of the wastewater collecting pipe 42A is integrally formed to the pipe wall of the pure water collecting pipe 41A of the central pipe 40A, and the remaining part of the wastewater collecting pipe 42A is not connected or fixed to any other structure, and is not supported, so that the wastewater collecting pipe 42A is configured as an elongated cantilever structure. Therefore, the wastewater pipeline formed by the wastewater collecting pipe 42A can be moved within a certain range when subjected to a force, thereby providing certain flexibility.

Therefore, the filter M2 and the filter element 2A thereof according to the second embodiment of the present invention can achieve the same effects as the filter M1 and the filter element 2 thereof according to the first embodiment of the present invention. The second embodiment of the present invention can simplify the structure of the filter element 2A, reduce the quantity of components, and reduce the manufacturing cost. Furthermore, it can easily achieve the positioning of the pure water outlet P1 and the wastewater outlet P2, which is conducive to the alignment of the filter element 2A with the corresponding part of the local manifold 1. Last but not least, it can lower the precision requirements on the manufacturing of the filter and simplify the mounting of the filter element 2A.

As compared with the filter M1 according to the first embodiment and the filter element 2 thereof in the present invention, the filter M2 according to the second embodiment and the filter element 2A thereof in the present invention can achieve further beneficial technical effects.

In the filter element 2A, the wastewater pipeline is formed only by the wastewater collecting pipe 42A, and it can be considered that the wastewater outlet pipe is a part of the wastewater collecting pipe 42A. That is, the wastewater outlet pipe and the wastewater collecting pipe are formed as a one-piece structure. Therefore, the structure of the filter element 2A is simpler than that of the filter element 2. The structure of the filter element 2A eliminated the assembling between the two pipes, and thus there is no need to provide a seal (e.g., the seventh seal S7 and the eighth seal S8 in the filter element 2) between the two, which further reduces the quantity of components. The assembling of the filter element 2A is thus simpler.

In the filter element 2A, the pure water pipeline is formed only by the pure water collecting pipe 41A, and it is considered that the pure water outlet pipe is a part of the pure water collecting pipe 41A. That is, the pure water outlet pipe and the pure water collecting pipe are formed as a one-piece structure. Therefore, the structure of the filter element 2A is simpler than that of the filter element 2. The structure of the filter element 2A eliminated the assembling between the pure water outlet pipe and the pure water collecting pipe, and thus there is no need to provide a seal (e.g., the fifth seal member S5 and the sixth seal member S6 in the filter element 2) between the two, which further reduces the quantity of components. The assembling of the filter element 2A is thus simpler.

The filter according to preferred embodiments and the filter element thereof of the present invention are shown above. However, modifications may be made based on the above preferred embodiments according to the concept of the present invention, and these modifications are also included in the scope of the present invention.

In the filter element 2 according to the first embodiment of the present invention, the wastewater outlet pipe 44 is hermetically attached to the wastewater collecting pipe 42 of the central pipe 40 in a detachable manner, so that the wastewater outlet pipe 44 and the wastewater collecting pipe 42 together form an elongated cantilever structure, thereby providing mounting flexibility for the wastewater pipeline. However, the present invention is not limited thereto. In other modifications of the present invention, the wastewater outlet pipe may also be hermetically attached to the wastewater collecting pipe of the central pipe in a detachable manner or in a non-detachable manner using other connecting methods commonly used in the art, such that the wastewater outlet pipe can be shaken with respect to the wastewater collecting pipe of the permeable membrane central pipe, thereby providing the required mounting flexibility for the wastewater pipeline. For example, in a modification of the present invention, the wastewater outlet pipe can be hermetically hinged (e.g., through a ball joint) to the wastewater collecting pipe of the central pipe such that when the filter element is mounted to the local manifold 1 of the filter, the wastewater outlet pipe can be rotated within a certain range around the joint, thereby providing the above mounting flexibility for the wastewater pipeline.

In the filter element 2 according to the first embodiment of the present invention, two seals (e.g., the fifth seal S5 and the sixth seal S6, and the seventh seal S7 and the eighth seal S8) are respectively shown at the junctions of the wastewater collecting pipe of the central pipe and other structural members and at the junctions of the pure water collecting pipe and other structural members. However, the present invention is not limited thereto, and in other modifications of the present invention, more or less seals may be provided as required at the junctions of the wastewater collecting pipe and/or the pure water collecting pipe and other structural members. For example, only one seal or three seals can be provided at each joint.

In the filter element 2A according to the second embodiment of the present invention, the wastewater collecting pipe 42A and the pure water collecting pipe 41A of the central pipe 40A each extend to the filter element housing top cover 21 to provide the pure water outlet P1 and the wastewater outlet P2. However, the present invention is not limited thereto, and in other modifications of the present invention, only one between the wastewater collecting pipe and the pure water collecting pipe of the central pipe may be caused to extend to the filter element housing top cover, and the other may be attached to another structural member. For example, in a modification of the present invention, the wastewater collecting pipe of the central pipe extends to the filter element housing top cover and thus provides the wastewater outlet P2, and a separate pure water outlet pipe (e.g., the central pipe adapter 43 in the filter element 2) is attached to the pure water collecting pipe of the central pipe. In another modification of the present invention, the pure water collecting pipe of the central pipe extends to the filter element housing top cover to provide the pure water outlet P1, and a separate wastewater outlet pipe (e.g., the wastewater outlet pipe 44 in the filter element 2) is attached to the wastewater collecting pipe of the central pipe.

In the embodiments shown above, the lower end part of the wastewater collecting pipe of the central pipe is integrally formed with the pure water collecting pipe, and the pure water passage V2 formed between the wastewater collecting pipe and the pure water collecting pipe only extends over a part of the length of the filter medium unit 30 along the longitudinal direction. However, the present invention is not limited thereto.

In other modifications according to the present invention, the wastewater collecting pipe and the pure water collecting pipe of the central pipe may be two completely separate components. In this configuration, the wastewater collecting pipe is concentrically disposed in the pure water collecting pipe, and an additional seal is disposed to seal one end part of the pure water passage formed between the wastewater collecting pipe and the pure water collecting pipe. For example, the seal may be disposed in an annular space between the wastewater collecting pipe and the pure water collecting pipe at a position close to the lower end part of the wastewater collecting pipe. This modification can achieve technical effects similar to the above.

In other modifications according to the present invention, the wastewater collecting pipe of the central pipe may be arranged to extend over the entire length of the filter medium unit along the longitudinal direction of the filter element, and thus the pure water passage formed between the wastewater collecting pipe and the pure water collecting pipe of the central pipe may be disposed to extend over the entire length of the filter medium unit along the longitudinal direction of the filter element. In this configuration, preferably, the pure water collecting holes on the pure water collecting pipe are distributed across the entire length of the filter medium unit, thereby increasing the water discharge rate.

In the embodiment shown above, the filter element housing top cover 21 is hermetically attached to the filter element housing 22 in a detachable manner, and the filter element housing bottom cover 23 is integrally formed with the filter element housing 22. However, the present invention is not limited thereto. In other modifications according to the present invention, at least one of the filter element housing top cover and the filter element housing bottom cover is hermetically attached to the filter element housing 12 in a detachable manner or in a non-detachable manner. For example, in a modification of the present invention, the filter element housing top cover is integrally formed with the filter element housing, and the filter element housing bottom cover is hermetically attached to the filter element housing in a detachable manner or in a non-detachable manner.

Here, the exemplary embodiments of the present invention have been described in detail. However, it should be understood that the present invention is not limited to the detailed description above and the illustrated specific embodiments. Persons skilled in the art can make various variations of the present invention without departing from the subject and scope of the present invention. All these variations fall within the scope of the present invention. In addition, all members described herein can be replaced with other technically equivalent members.

The invention claimed is:

1. A filter element (2, 2A), the filter element (2, 2A) comprising:
   a filter element housing part (20), the filter element housing part (20) being provided with a water inlet (211);
   a filter medium unit (30), the filter medium unit (30) being disposed in the filter element housing part (20); and
   a central pipe (40, 40A), the central pipe (40, 40A) being disposed in the filter element housing part (20), and the filter medium unit (30) being disposed around the central pipe (40, 40A), wherein the central pipe (40, 40A) comprises a pure water collecting pipe (41, 41A) and a wastewater collecting pipe (42, 42A), and the wastewater collecting pipe (42, 42A) is at least partially disposed in the pure water collecting pipe (41, 41A);

a raw water passage (V1) of the filter element (2, 2A) is at least partially formed between the inner wall of the filter element housing part (20) and the filter medium unit (30);

a pure water passage (V2) of the filter element (2, 2A) is at least partially formed between the inner wall of the pure water collecting pipe (41, 41A) and the outer wall of the wastewater collecting pipe (42, 42A); and a wastewater passage (V3) of the filter element (2, 2A) is at least partially formed in the wastewater collecting pipe (42, 42A).

2. The filter element (2) according to claim 1, wherein the central pipe (40) further comprises a central pipe adapter (43) and a wastewater outlet pipe (44), a pure water pipeline of the filter element (2) comprises the pure water collecting pipe (41) and the central pipe adapter (43), and a wastewater pipeline of the filter element (2) comprises the wastewater collecting pipe (42) and the wastewater outlet pipe (44), wherein a first end part (432) of the central pipe adapter (43) is hermetically attached to a first end part of the pure water collecting pipe (41), and a second end part (431) of the central pipe adapter (43) forms a pure water outlet (P1), wherein a first end part of the wastewater outlet pipe (44) is hermetically attached to a first end part of the wastewater collecting pipe (42), and a second end part of the wastewater outlet pipe (44) forms a wastewater outlet (P2), and wherein the raw water passage (V1) further comprises a gap between the inner wall of the filter element housing part (20) and the outer wall of the central pipe adapter (43), the pure water passage (V2) further comprises a gap between the inner wall of the central pipe adapter (43) and the outer wall of the wastewater outlet pipe (44), and the wastewater passage (V3) further comprises the wastewater outlet pipe (44).

3. The filter element (2) according to claim 2, wherein the first end part of the wastewater outlet pipe (44) is hermetically hinged to the first end part of the wastewater collecting pipe (42).

4. The filter element (2) according to claim 2, wherein the wastewater outlet pipe (44) and the wastewater collecting pipe (42) are made of the same material, or the wastewater outlet pipe (44) is made of a material more flexible than that of the wastewater collecting pipe (42).

5. The filter element (2A) according to claim 1, wherein the central pipe (40A) further comprises a pure water outlet pipe and a wastewater outlet pipe, a pure water pipeline of the filter element (2A) comprises the pure water collecting pipe (41A) and the pure water outlet pipe, and a wastewater pipeline of the filter element (2A) comprises the wastewater collecting pipe (42A) and the wastewater outlet pipe, wherein a first end part of the pure water outlet pipe is integrally formed with a first end part of the pure water collecting pipe (41A), and/or a first end part of the wastewater outlet pipe is integrally formed with a first end part of the wastewater collecting pipe (42A), and wherein a second end part of the pure water outlet pipe forms a pure water outlet (P1), a second end part of the wastewater outlet pipe forms a wastewater outlet (P2), the raw water passage (V1) further comprises a gap between the inner wall of the filter element housing part (20) and the outer wall of the pure water outlet pipe, the pure water passage (V2) further comprises a gap between the inner wall of the pure water outlet pipe and the outer wall of the wastewater outlet pipe, and the wastewater passage (V3) further comprises the wastewater outlet pipe.

6. The filter element (2, 2A) according to claim 2, wherein a second end part of the wastewater collecting pipe (42, 42A) is integrally formed to the pipe wall of the pure water collecting pipe (41, 41A); or a second end part of the wastewater collecting pipe (42, 42A) is hermetically attached to the pipe wall of the pure water collecting pipe (41, 41A).

7. The filter element (2, 2A) according to claim 6, wherein the second end part of the wastewater collecting pipe (42, 42A) is adjacent to a second end part of the pure water collecting pipe (41, 41A) such that the wastewater collecting pipe (42, 42A) extends over a major part of the length of the pure water collecting pipe (41, 41A).

8. The filter element (2, 2A) according to claim 6, wherein a truncated-conical structure (413) is formed between the second end part of the wastewater collecting pipe (42, 42A) and the pure water collecting pipe (41, 41A).

9. The filter element (2, 2A) according to claim 1, wherein the pure water passage (V2) extends over at least a part of the length of the filter medium unit (30) along the longitudinal direction of the filter element (2, 2A), a plurality of pure water collecting holes (411) are disposed on the pipe wall of the pure water collecting pipe (41, 41A), and the plurality of pure water collecting holes (411) are distributed across at least a part of the length of the filter medium unit (30).

10. The filter element (2, 2A) according to claim 2, wherein the wastewater pipeline is disposed such that the wastewater outlet (P2) extends out from the filter element housing part (20), and the wastewater pipeline is adapted to be shaken flexibly when subjected to a force.

11. The filter element according to claim 10, wherein the wastewater pipeline forms an elongated cantilever structure such that the wastewater pipeline is adapted to be shaken flexibly when subjected to a force.

12. The filter element (2, 2A) according to claim 1, wherein at least two members from the group consisting of the pure water collecting pipe (41, 41A), the wastewater collecting pipe (42, 42A), and the filter element housing part (20) are disposed to be concentric with each other.

13. The filter element (2, 2A) according to claim 1, wherein the filter medium unit (30) is a reverse osmosis membrane or a nanofiltration.

14. A filter (M1, M2), the filter (M1, M2) comprising a local manifold 1 (1) and the filter element (2, 2A) according to claim 1, wherein the filter element (2, 2A) is mounted to the local manifold 1 (1) such that the water inlet (211) of the filter element (2, 2A) is in communication with a raw water port (11) of the local manifold 1 (1), the pure water outlet (P1) of the filter element (2, 2A) is in communication with a pure water port (12) of the local manifold 1 (1), and the wastewater outlet (P2) of the filter element (2, 2A) is in communication with a wastewater port (13) of the local manifold 1 (1).

* * * * *